No. 841,275. PATENTED JAN. 15, 1907.
F. L. SMITH.
CAR WHEEL.
APPLICATION FILED MAY 20, 1905.
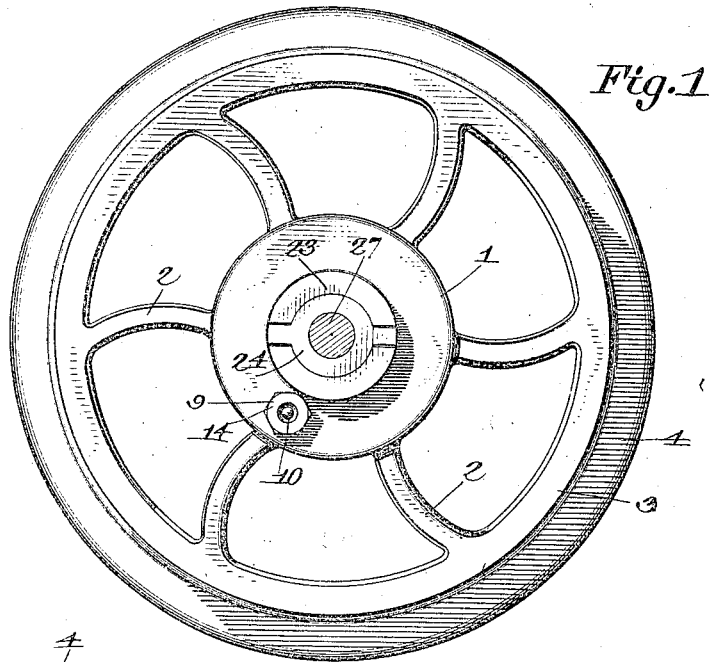
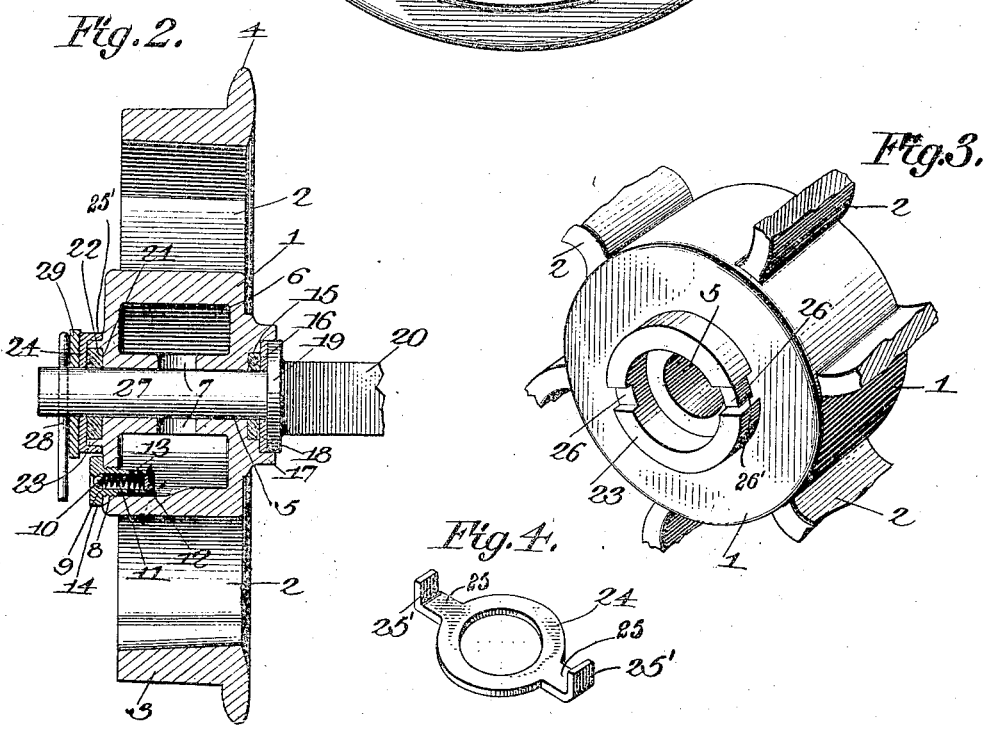
Witnesses
Frederic L. Smith, Inventor
by
Attorneys

UNITED STATES PATENT OFFICE.

FREDERIC LUTHER SMITH, OF HAMDEN JUNCTION, OHIO.

CAR-WHEEL.

No. 841,275.

Specification of Letters Patent.

Patented Jan. 15, 1907.

Application filed May 20, 1905. Serial No. 261,474.

*To all whom it may concern:*

Be it known that I, FREDERIC LUTHER SMITH, a citizen of the United States, residing at Hamden Junction, in the county of Vinton and State of Ohio, have invented a new and useful Car-Wheel, of which the following is a specification.

This invention relates to car-wheels of that class which are sometimes known as "self-lubricating" and which are formed with a receptacle for lubricating material of a liquid or viscous nature which as the wheel rotates upon its spindle is gradually supplied to the bearing.

The objects of the invention are to simplify and improve the construction and operation of this class of devices, and with these and other ends in view, which will readily appear as the nature of the invention is better understood, the same consists in the improved construction and novel arrangement and combination of parts, which will be hereinafter fully described, and particularly pointed out in the claim.

In the drawings, Figure 1 is a side elevation of the car-wheel constructed in accordance with the principles of the invention. Fig. 2 is a vertical sectional view of the same. Fig. 3 is a perspective detail view of the hub of the wheel, showing the same disconnected from the axle. Fig. 4 is a perspective detail view of the locking-washer detached.

Corresponding parts in the several figures are indicated throughout by similar characters of reference.

The improved car-wheel of this invention is composed of a hub 1, spokes 2, and a rim 3, having a flange 4, the same being usually formed as one integral casting.

The hub 1 is formed in the usual manner with an aperture 5, constituting an axle-box, and surrounding said aperture is a recess or cavity 6, constituting a lubricant-receptacle which communicates with the axle-box through slots 7 in the walls of the latter. The front side of the hub has an aperture 8, into which is threaded a casing 9, in the outer end of which is seated a ball-valve 10, normally forced to its seat by a spring 11, contained in the casing and the tension of which is regulated by means of a screw-plug 12. The sides of the casing are provided with openings 13, and the outer end of the casing is provided with a non-circular head 14, constituting a wrench-seat, whereby said casing may be screwed into position.

In the rear side of the hub 1 there is formed an annular recess 15, in which is seated a washer 16, of felt or similar compressible and bibulous material. Surrounding the recess 15 there is formed an annular flange 17, in which is placed an ordinary washer 18, the flange 17 serving also to accommodate the collar 19 of the axle 20, the spindle of which extends through the axle-box.

The outer end of the hub has a recess 21, surrounded by an annular flange 23 and forming a seat for a washer 22, of felt or similar compressible or bibulous material. Within the flange 23 there is also placed a locking-washer 24, provided with arms 25, engaging recesses 26 in the flange 23, with which the said washer is thus placed in locking engagement, so as to rotate with the wheel.

The radially-extending recesses 26, located in the flange 23, are provided at their outer ends with portions or extensions 26', which pass along the sides of the flanges and terminate at the face of the hub 1. The arms 25 of the washer 24 extend in the same plane as the body of the washer and enter the radially-extending recesses 26. The said arms 25 are provided with the upturned ends 25', which enter the portions 26' of the said recesses. The said arms 25 and their ends entering the recesses 26 in the manner as above described prevent the leakage of oil and keep the interior of the hub free from dust.

After the wheel is placed or mounted in position for rotation upon the spindle 27 of the axle 20 it is secured, preferably, by means of a cotter-pin 28, a washer 29 being interposed between said pin and the locking-washer in order to take up slack and to prevent direct frictional contact between the locking-washer and the cotter-pin.

When the wheel rotates upon the spindle, the lubricant will pass through the slots 12 and will spread in a thin film between the surfaces of the spindle and the axle-box, thus keeping said surfaces well and sufficiently lubricated. The lubricant that passes toward the ends of the spindle will become absorbed by the felt washers 16 and 22, which latter, as they absorb the lubricant, will expand and press tightly against the spindle, thus preventing the escape and wasteful use of lubricating material. It will be observed that the washers 16 and 22 will be compressed to some extent by the washers 18 and 24 contiguous thereto; but the washer 16, which is accommodated within the flange 17, is of greater diameter than the recess 15, holding the washer 16, and it may not pass into said recess. Likewise the washer 24 may not move in the direction of the washer 22 beyond the point at which the arms 25 of said washer engage the recesses 26 in the flange 23. Hence the washers 16 and 22 may not be compressed by the adjacent rigid washers to an extent which would interfere with their capacity for absorbing oil and for wiping the surface of the spindle in such a manner as to keep the latter well lubricated without danger of waste.

Under the improved construction herein described the wheel in case of breakage or injury may be readily detached and replaced without the use of special tools, an advantage which will be greatly appreciated in case of accidents occurring at a distance from the tool-house or workshops. Oil may be readily introduced into the lubricant-receptacle by placing the nozzle of a syringe or squirt charged with oil against the ball-valve 10 with sufficient pressure to unseat the latter, after which the lubricant may be forced into the receptacle, where it is retained by the self-closing valve 10. From the receptacle 6 the lubricant is fed freely to the axle; but waste is avoided, owing to the presence of the washers 15 and 22, as previously described.

Having thus described the invention, what is claimed is—

A self-lubricating car-wheel having a hub provided at its outer end with a flange surrounding the bore and provided with radially-extending recesses which at their outer ends extend along the sides of the flange to the face of the hub, said hub adapted to receive a spindle, a compressible bibulous washer seated within said flange, a washer adapted to receive the spindle, said washer having arms provided with portions in the same plane as the body of the washer which enter the radially-extending ends of said flange-recesses and upturned ends which enter the ends of said recesses that extend along the side of the flange, and means for holding the parts in place.

In testimony that I claim the foregoing as my own I have hereto affixed my signature in the presence of two witnesses.

FREDERIC LUTHER SMITH.

Witnesses:
B. W. THACKER,
E. W. ROBBINS.